United States Patent
Tu et al.

(10) Patent No.: US 11,965,783 B2
(45) Date of Patent: Apr. 23, 2024

(54) TEMPERATURE SENSING CIRCUIT

(71) Applicant: Realtek Semiconductor Corporation, Hsinchu (TW)

(72) Inventors: Chih-Chan Tu, Taipei (TW); Chih-Lung Chen, Zhubei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 375 days.

(21) Appl. No.: 17/143,541

(22) Filed: Jan. 7, 2021

(65) Prior Publication Data
US 2021/0223112 A1    Jul. 22, 2021

(30) Foreign Application Priority Data
Jan. 20, 2020   (TW) ................................ 109102017

(51) Int. Cl.
*G01K 7/00*    (2006.01)
(52) U.S. Cl.
CPC ...................... *G01K 7/00* (2013.01)
(58) Field of Classification Search
CPC ............ G01K 7/00; G01K 7/01; G01K 3/005; G01K 7/425; G01K 7/16; G01K 15/005;
(Continued)

(56) References Cited

U.S. PATENT DOCUMENTS

| | | | | |
|---|---|---|---|---|
| 5,081,410 A | * | 1/1992 | Wood ........................ | G05F 3/30 330/108 |
| 5,085,526 A | * | 2/1992 | Sawtell ................... | G01K 3/005 327/512 |

(Continued)

FOREIGN PATENT DOCUMENTS

| CN | 107390771 A | * | 11/2017 | ............... G05F 3/26 |
|---|---|---|---|---|
| CN | 107992146 B | * | 10/2019 | ............. G05F 1/567 |

OTHER PUBLICATIONS

Takao Oshita et al., "Compact BJT-Based Thermal Sensor for Processor Applications in a 14 nm tri-Gate CMOS Process", IEEE Journal of Solid-State Circuits, vol. 50, No. 3, Mar. 2015.

(Continued)

*Primary Examiner* — Gail Kaplan Verbitsky
(74) *Attorney, Agent, or Firm* — Locke Lord LLP; Tim Tingkang Xia, Esq.

(57) ABSTRACT

A temperature sensing circuit that includes a bandgap voltage generation circuit, a current mirror branch, a variable resistor, a comparator circuit, a control circuit and a temperature determining circuit. The bandgap voltage generation circuit generates a bandgap voltage. The current mirror branch generates a mirrored current mirrored from the bandgap voltage generation circuit. The variable resistor is electrically coupled to the current mirror branch to receive the mirrored current to generate a variable voltage. The comparator circuit compares the bandgap voltage and the variable voltage to generate a comparison result. The control circuit generates a control signal according to the comparison result to adjust the resistance of the variable resistor and outputs a signal value when the signal value forces the variable voltage to be equal to the bandgap voltage. The temperature determining circuit generates a temperature value according to the signal value.

9 Claims, 3 Drawing Sheets

(58) Field of Classification Search
CPC .......... G01K 7/34; G01K 15/007; G01K 7/20;
G01K 7/24; G01K 7/21; G01K 1/026;
G01K 7/015; G01K 1/028; G01K 7/22;
G01K 7/25; G01K 7/183; G01K 7/13;
G01K 7/186; G01K 7/206; G01K 11/006;
G01K 13/20; G01K 3/14; G01K 7/02;
G01K 7/14; G01K 7/18; G01K 1/08;
G01K 1/143; G01K 1/16; G01K 13/08;
G01K 15/002; G01K 2205/00; G01K
2217/00; G01K 7/203
See application file for complete search history.

(56) References Cited

U.S. PATENT DOCUMENTS

| | | | | |
|---|---|---|---|---|
| 6,876,250 B2* | 4/2005 | Hsu | ............... | G01K 7/015 |
| | | | | 327/512 |
| 6,894,473 B1* | 5/2005 | Le | ............... | G05F 3/30 |
| | | | | 327/542 |
| 7,225,099 B1* | 5/2007 | O'Dwyer | ............... | G01K 7/01 |
| | | | | 374/E7.035 |
| 7,455,452 B2* | 11/2008 | Seo | ............... | G11C 11/406 |
| | | | | 374/171 |
| 7,560,979 B1* | 7/2009 | Hsu | ............... | G05F 3/30 |
| | | | | 327/539 |
| 7,724,068 B1* | 5/2010 | Smith | ............... | G01K 3/005 |
| | | | | 327/539 |
| 8,583,398 B2* | 11/2013 | Cheng | ............... | G01K 7/01 |
| | | | | 327/539 |
| 8,698,479 B2* | 4/2014 | Tung | ............... | G05F 3/30 |
| | | | | 323/313 |
| 8,907,652 B2* | 12/2014 | Lecce | ............... | G05F 3/30 |
| | | | | 327/539 |
| 8,952,675 B2* | 2/2015 | Fort | ............... | G05F 1/625 |
| | | | | 327/539 |
| 2003/0201822 A1* | 10/2003 | Kang | ............... | G05F 3/30 |
| | | | | 327/539 |
| 2007/0046363 A1* | 3/2007 | Tanzawa | ............... | G05F 3/30 |
| | | | | 327/539 |
| 2008/0157746 A1* | 7/2008 | Chen | ............... | G05F 3/30 |
| | | | | 323/313 |
| 2012/0068685 A1* | 3/2012 | Chang | ............... | G05F 3/30 |
| | | | | 323/313 |
| 2012/0169413 A1* | 7/2012 | Choi | ............... | G05F 3/30 |
| | | | | 327/539 |
| 2016/0246317 A1* | 8/2016 | Song | ............... | G05F 1/575 |
| 2021/0211044 A1* | 7/2021 | Nakatani | ............... | G05F 3/30 |

OTHER PUBLICATIONS

Mei-Chen Chuang et al., "A Temperature Sensor with a 3 Sigma Inaccuracy of ±2° C. without Trimming from -50° C. to 150° C. in a 16nm FinFET Process", ESSCIRC Conference 2015—41st European Solid-State Circuits Conference (ESSCIRC), 2015, pp. 271-274.

Matthias Eberlein et al., "A 28nm CMOS Ultra-Compact Thermal Sensor in Current-Mode Technique", 2016 Symposium on VLSI Circuits Digest of Technical Papers, 2016.

Cho-Ying Lu et al., "An 8b Subthreshold Hybrid Thermal Sensor with ±1.07° C. Inaccuracy and Single-Element Remote-Sensing Technique in 22nm FinFET", 2018 IEEE International Solid—State Circuits Conference (ISSCC), Session 19, 2018.

\* cited by examiner

TEMPERATURE SENSING CIRCUIT

CROSS-REFERENCE TO RELATED APPLICATION

This application claims priority to Taiwan Application Serial Number 109102017, filed Jan. 20, 2020, which is herein incorporated by reference in its entirety.

BACKGROUND

Field of Invention

The present disclosure relates to a temperature sensing technology, and in particular, to a temperature sensing circuit.

Description of Related Art

In low-voltage system-on-a-chip circuits, the temperature inside the chip can be sensed using characteristics that vary with time or that the signal delay varies with temperature. However, common temperature sensing circuits, whether they use a delay line to generate a signal with a time difference for temperature sensing, or use a current difference between current mirror branches for temperature sensing, are susceptible to the process deviation of the metal-oxide-semiconductor transistor in the circuit or the effect of channel length modulation, which lead to inaccurate temperature sensing.

Therefore, how to design a new temperature sensing circuit to solve the above-mentioned shortcomings is an urgent issue for the industry.

SUMMARY

This summary is intended to provide a simplified summary of this disclosure so that readers may have a basic understanding of this disclosure. This summary is not a comprehensive overview of the disclosure, and it is not intended to indicate important/critical elements of the embodiments of the disclosure or to define the scope of the disclosure.

An object of the present disclosure is to provide a temperature sensing circuit to improve the problems of the prior art.

To achieve the above object, a technical aspect of the present disclosure relates to a temperature sensing circuit, which includes a band gap voltage generating circuit, a current mirror branch, a variable resistor, a comparison circuit, a control circuit, and a temperature determining circuit. The band gap voltage generating circuit is configured to generate a band gap voltage having a first temperature coefficient. The current mirror branch is configured to mirror an image current having a second temperature coefficient different from the first temperature coefficient from the band gap voltage generating circuit. The variable resistor comprises a first end electrically coupled to the current mirror branch to receive the image current and generate a variable voltage at the first end. The comparison circuit is configured to compare the band gap voltage and the variable voltage to generate a comparison result. The control circuit is configured to generate a control signal to continuously adjust a resistance value of the variable resistor according to the comparison result, and output a signal value of the control signal when the signal value forces the variable voltage to be substantially equal the bandgap voltage. The temperature determining circuit is configured to generate a temperature value according to the signal value.

When the temperature sensing circuit of the present disclosure completes the sensing, the voltages used for comparison to sense the temperature are equal to each other, thereby eliminating the channel length modulation effect between the transistors used to generate the two voltages and greatly improving the accuracy of temperature sensing.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
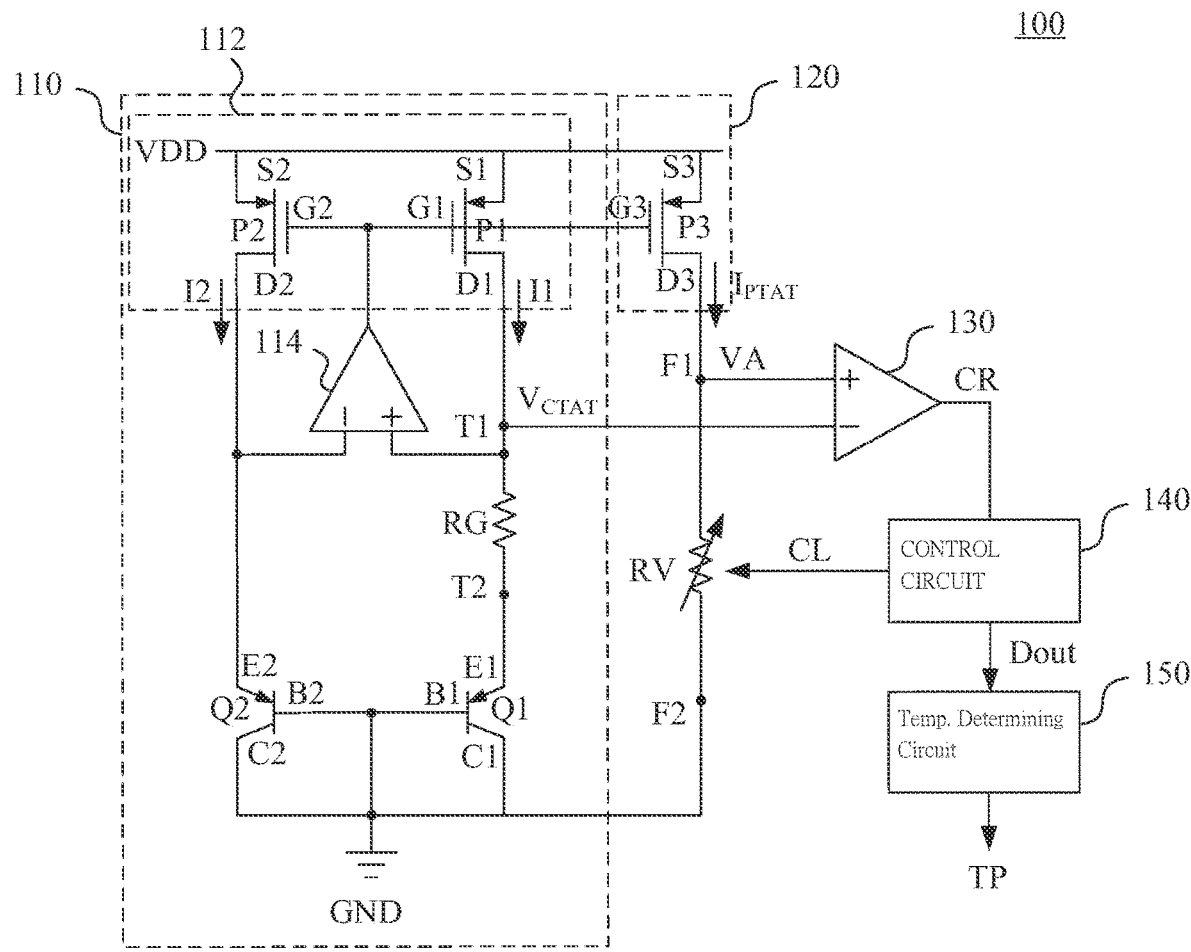
FIG. 1 is a circuit diagram of a temperature sensing circuit according to an embodiment of the present disclosure.

Reference is made to FIG. 1. FIG. 1 is a circuit diagram of a temperature sensing circuit 100 according to an embodiment of the present disclosure. The temperature sensing circuit 100 includes a band gap voltage generating circuit 110, a current mirror branch 120, a variable resistor RV, a comparison circuit 130, a control circuit 140, and a temperature determining circuit 150.

The band gap voltage generating circuit 110 is configured to generate a band gap voltage $V_{CTAT}$ having a first temperature coefficient. In one embodiment, the band gap voltage generating circuit 110 includes a current source circuit 112, a resistor RG, a pair of bipolar junction transistors Q1, Q2, and a voltage equalization circuit 114.

In one embodiment, the current source circuit 112 includes a first current source branch corresponding to the first current output terminal and a second current source branch corresponding to the second current output terminal. The first current source branch includes a P-type metal-oxide-semiconductor transistor P1, and the second current source branch includes a P-type metal-oxide-semiconductor transistor P2.

A pair of sources S1 and S2 of the P-type metal-oxide-semiconductor transistors P1 and P2 are electrically coupled to the voltage source VDD. The drain D1 of the P-type metal-oxide-semiconductor transistor P1 is used as a first current output terminal to output a current I1. The drain D2 of the P-type metal-oxide-semiconductor transistor P2 is used as a second current output terminal to output the current I2.

The resistor RG includes a first terminal T1 electrically coupled to the first current output terminal and a second terminal T2.

A pair of base electrodes B1 and B2 of the bipolar junction transistor Q1 and Q2 are electrically coupled to each other, and the pair of base electrodes B1 and B2 are further electrically coupled to the ground terminal GND. A pair of collectors C1 and C2 of the bipolar junction transistor Q1 and Q2 are electrically coupled to the ground terminal GND.

In addition, the emitter E1 of the bipolar junction transistor Q1 is electrically coupled to the second terminal T2 of the resistor RG. Therefore, the emitter E1 of the bipolar junction transistor Q1 and the first current output terminal (i.e., the drain D1 of the P-type metal-oxide-semiconductor transistor P1) are electrically coupled to each other through the resistor RG. The emitter E2 of the bipolar junction transistor Q2 is electrically coupled to the second current output terminal (i.e., the drain D2 of the P-type metal-oxide-semiconductor transistor P2).

The voltage equalization circuit 114 is configured to be electrically coupled to the first current output terminal and the second current output terminal (the drain electrodes D1 and D2 of the P-type metal-oxide-semiconductor transistors P1 and P2), and control the current source circuit 112 to make the first current output terminal and the second current output terminal having same voltage level.

In particular, in one embodiment, the voltage equalization circuit 114 is an operational amplifier, and includes a positive input terminal, a negative input terminal and an output terminal which are respectively marked with '+', '−' and 'o' symbols in FIG. 1.

The positive input terminal is electrically coupled to the first current output terminal (the drain D1 of the P-type metal-oxide-semiconductor transistor P1) and the emitter E1 is electrically coupled to the bipolar junction transistor Q1 through the resistor RG. The negative input terminal is electrically coupled to the second current output terminal (the drain D2 of the P-type metal-oxide-semiconductor transistor P2) and the emitter E2 of the bipolar junction transistor Q2.

The output terminal is electrically coupled to a pair of gate electrodes G1 and G2 of the P-type metal-oxide-semiconductor P1 and P2, and is configured to control the P-type metal-oxide-semiconductor P1 and P2, to achieve the effect of equaling the voltages of the first current output terminal and the second current output terminal.

With the above structure, the band gap voltage generating circuit 110 can generate a band gap voltage $V_{CTAT}$ having a first temperature coefficient at the first terminal T1 of the resistor RG. In an embodiment, the current I1 and the current I2 output by the current source circuit 112 both have a positive temperature coefficient, that is, the current values of the current I1 and the current I2 both increase as the temperature of the environment in which the temperature sensing circuit 100 is located increases. Therefore, for the band gap voltage $V_{CTAT}$, its first temperature coefficient is a negative temperature coefficient. That is, the voltage value of the band gap voltage $V_{CTAT}$ becomes smaller as the temperature of the environment in which the temperature sensing circuit 100 is located increases.

The current mirror branch 120 is configured to mirror the mirror current $I_{PTAT}$ having a second temperature coefficient different from the first temperature coefficient from the band gap voltage generating circuit 110.

In particular, in an embodiment, the current mirror branch 120 includes a P-type metal-oxide-semiconductor transistor P3. The source S3 of the P-type metal-oxide-semiconductor P3 is electrically coupled to the voltage source VDD, the gate G3 is electrically coupled to the gates G1 and G2 of the P-type metal-oxide-semiconductor P1 and P2, and the drain D3 is used as the third current output terminal.

Therefore, in the current mirror branch 120 and the current source circuit 112, the second current source branch including the P-type metal-oxide-semiconductor transistor P2 together forms a current mirror to generate a mirror current $I_{PTAT}$ based on the current I2 by mirroring, and outputs output from drain D3 of the P-type metal-oxide-semiconductor transistor P3. Since the current I2 generated by the second current source branch has a positive temperature coefficient, the second temperature coefficient of the mirror current $I_{PTAT}$ is also a positive temperature coefficient.

The variable resistor RV includes a first terminal F1 electrically coupled to the current mirror branch 120 and a second terminal F2 electrically coupled to the ground terminal GND. The variable resistor RV receives the mirror current $I_{PTAT}$ and generates a variable voltage VA at the first terminal F1.

The comparison circuit 130 is configured to compare the band gap voltage $V_{CTAT}$ and the variable voltage VA to generate a comparison result CR.

In an embodiment, the control circuit 140 is a successive approximation control circuit, and is configured to generate a control signal CL according to the comparison result CR to continuously adjust the resistance value of the variable resistor RV, and output a signal value Dout when the signal value Dout of the control signal CL forces the variable voltage VA to be substantially equal the bandgap voltage $V_{CTAT}$. In one embodiment, the control signal CL is a digital control signal, and the signal value Dout is a digital code.

In an embodiment, the term "substantially equal" means that there may be a reasonable error between the variable voltage VA and the band gap voltage $V_{CTAT}$, but not necessarily equal. In particular, under the most ideal condition, the resistance value of the variable resistor RV is controlled by the control circuit 140 to force the variable voltage VA be completely equal to the band gap voltage $V_{CTAT}$. However, in practice, the degree to which the variable voltage VA can approach the bandgap voltage $V_{CTAT}$ most depends on the adjustable precision of the variable resistor RV.

Therefore, when the control circuit 140 continues to adjust the resistance value of the variable resistor RV, if the comparison result CR shows that the difference between the variable voltage VA and the band gap voltage $V_{CTAT}$ is the smallest, then it is determined that the variable voltage VA and the band gap voltage $V_{CTAT}$ are substantially equal, and output the corresponding signal value Dout of the control signal CL.

It should be noted that the variable voltage VA is the voltage of the drain D3 of the P-type metal-oxide-semiconductor transistor P3, and the band gap voltage $V_{CTAT}$ is the voltage of the drain D1 of the P-type metal-oxide-semiconductor transistor P1. Therefore, when the variable voltage VA and the band gap voltage $V_{CTAT}$ are substantially equal, the voltages of the drain electrodes D1 and D3 of the P-type metal-oxide-semiconductor transistors P1 and P3 are also substantially equal.

The temperature determining circuit 150 is configured to generate a temperature value TP according to the signal value Dout. In one embodiment, the temperature determining circuit 150 may calculate the temperature value TP by, for example, but not limited to, querying a lookup table or a relationship between the signal value Dout and the temperature.

Taking the relationship between the signal value Dout and temperature as an example, since the variable voltage VA is substantially equal to the band gap voltage $V_{CTAT}$ and the value of the variable voltage VA is $I_{PTAT} \times RV$, the relationship between the variable voltage VA and the band gap voltage $V_{CTAT}$ can be expressed as:

$$I_{PTAT} \times RV = I_{PTAT} \times \text{Dout} \times Ru = V_{CTAT} \quad \text{(Equation 1)},$$

where Ru is a unit resistance of the variable resistance RV.

Further, the band gap voltage $V_{CTAT}$ and the variable voltage VA can be expressed as:

$$V_{CTAT} = V_0 - aT \quad \text{(Equation 2)},$$

$$VA = bT \quad \text{(Equation 3)},$$

where $V_0$ is an initial voltage, T is a temperature, a is a first temperature coefficient, and b is a second temperature coefficient.

By finishing the above Equations 1 to 3, the temperature T can be obtained:

$$T = V_0 / (Dout \times b \times Ru + a) \quad \text{(Equation 4)}$$

In some technologies, when the temperature sensing circuit 100 performs temperature sensing, different currents are often used to compare different responses to temperature changes to achieve the effect of sensing. However, this approach is likely to cause accuracy degradation due to the channel length modulation of the transistor used to generate these currents.

When the temperature sensing circuit 100 of the present disclosure completes the sensing, the voltages used for comparison to sense the temperature are equal to each other, thereby eliminating the channel length modulation effect between the transistors used to generate the two voltages and greatly improving the accuracy of temperature sensing.

Figure 2:
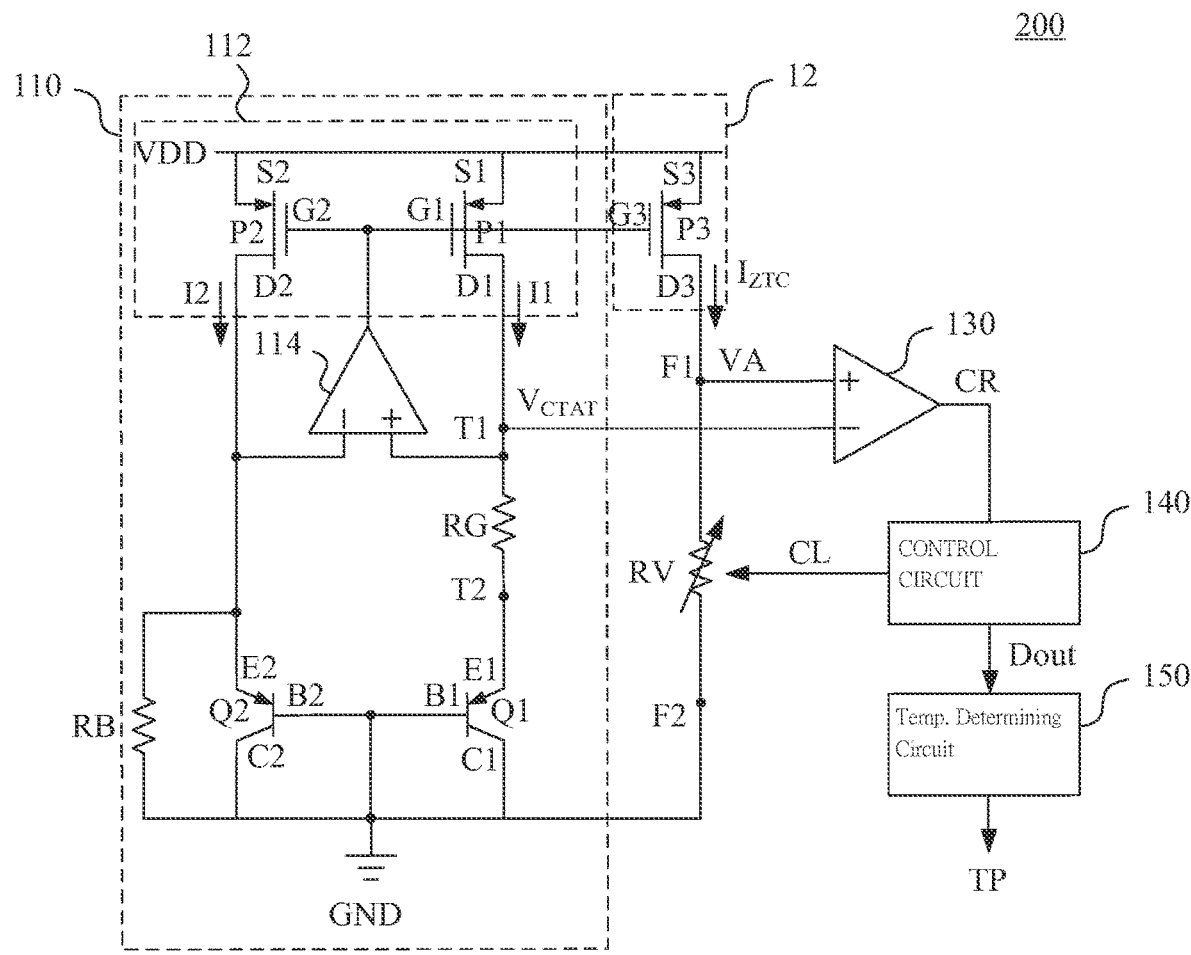
FIG. 2 is a circuit diagram of a temperature sensing circuit according to an embodiment of the present disclosure.

Reference is made to FIG. 2. FIG. 2 is a circuit diagram of a temperature sensing circuit 200 according to an embodiment of the present disclosure.

The temperature sensing circuit 200, which is similar to the temperature sensing circuit 100 of FIG. 1, includes a band gap voltage generating circuit 110, a current mirror branch 120, a variable resistor RV, a comparison circuit 130, a control circuit 140, and a temperature determining circuit 150. What differs from the temperature sensing circuit 100 shown in FIG. 1 is that the temperature sensing circuit 200 further includes a balancing resistor RB.

As shown in FIG. 2, the balancing resistor RB is connected in parallel with the bipolar junction transistor Q2 to achieve the purpose of balancing the current. In particular, the current I2 generated by the first current source branch and the second current source branch of the current source circuit 112 originally has a positive temperature coefficient. The addition of the balancing resistor RB will generate a current with a negative temperature coefficient, and with a suitable resistance value selection, the positive temperature coefficient effect of the current I2 will be canceled, and an image current $I_{ZTC}$ having a zero temperature coefficient that makes the image current $I_{ZTC}$ not depending to temperature is mirrored at the current mirror branch 120.

Similar to the temperature sensing circuit 100 discussed above, the variable resistor RV can receive the mirror current $I_{ZTC}$ and generate a variable voltage VA at the first terminal F1. The comparison circuit 130 is configured to compare the bandgap voltage $V_{CTAT}$ and the variable voltage VA to generate a comparison result CR. The control circuit 140 generates a control signal CL based on the comparison result CR to continuously adjust the resistance value of the variable resistor RV. A signal value Dout is outputted when the signal value Dout of the control signal CL forces the variable voltage VA to be substantially equal to the bandgap voltage $V_{CTAT}$. Next, the temperature determination circuit 150 is configured to generate a temperature value TP according to the signal value Dout.

Figure 3A:
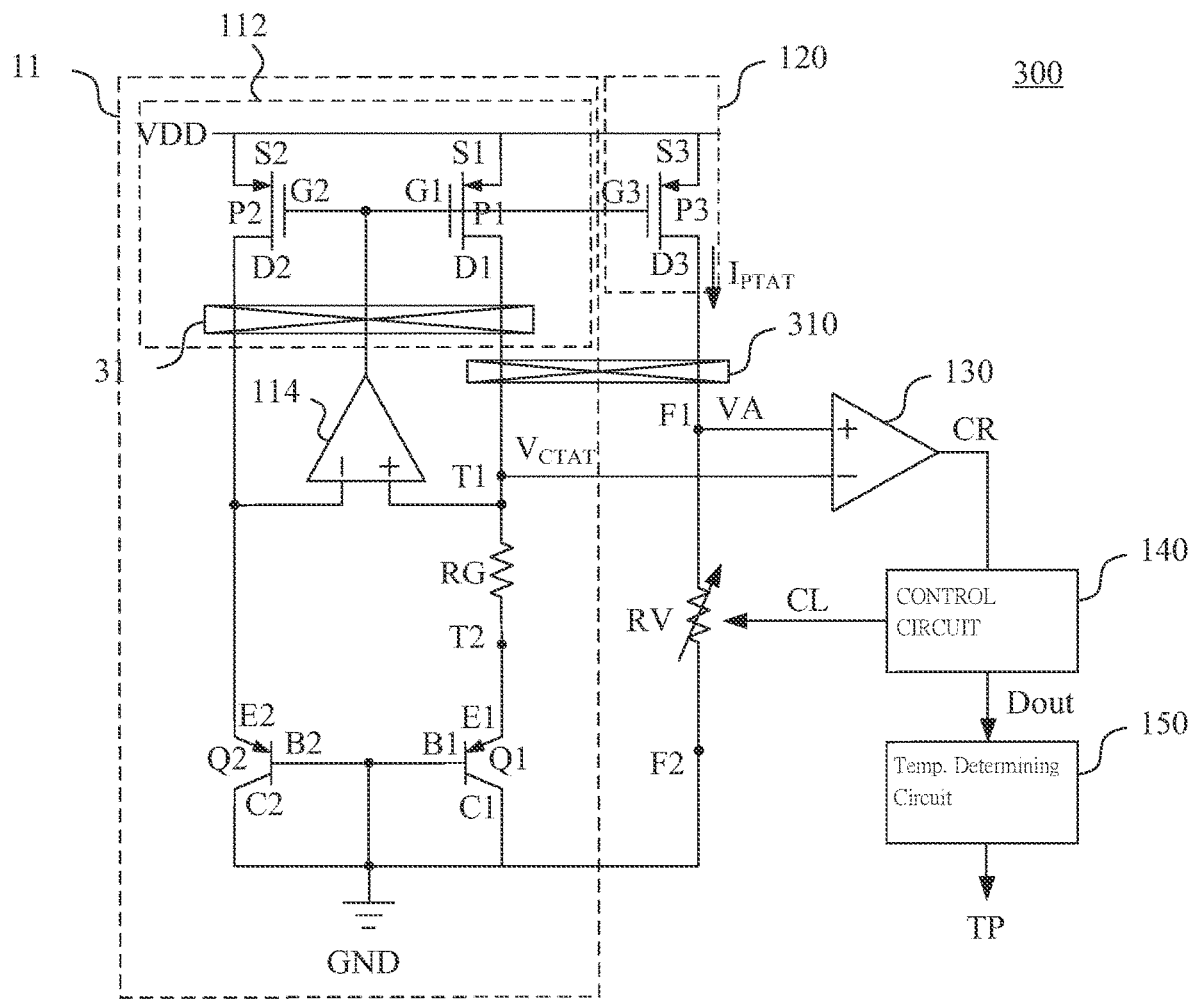
FIG. 3A is a circuit diagram of a temperature sensing circuit according to an embodiment of the present disclosure.

Reference is made to FIG. 3A. FIG. 3A is a circuit diagram of a temperature sensing circuit 300 according to an embodiment of the present disclosure.

The temperature sensing circuit 300, which is similar to the temperature sensing circuit 100 of FIG. 1, includes a band gap voltage generating circuit 110, a current mirror branch 120, a variable resistor RV, a comparison circuit 130, a control circuit 140, and a temperature determining circuit 150. What differs from the temperature sensing circuit 100 shown in FIG. 1 is that the temperature sensing circuit 300 further includes a plurality of averaging circuits 310.

In an embodiment, an averaging circuit 310 is included between the first current source branch and the second current source branch and between the first current source branch and the current mirror branch, and has a chopper and a dynamic element matching (DEM) circuit to average a corresponding pair of voltage signals to further increase accuracy.

Figure 3B:
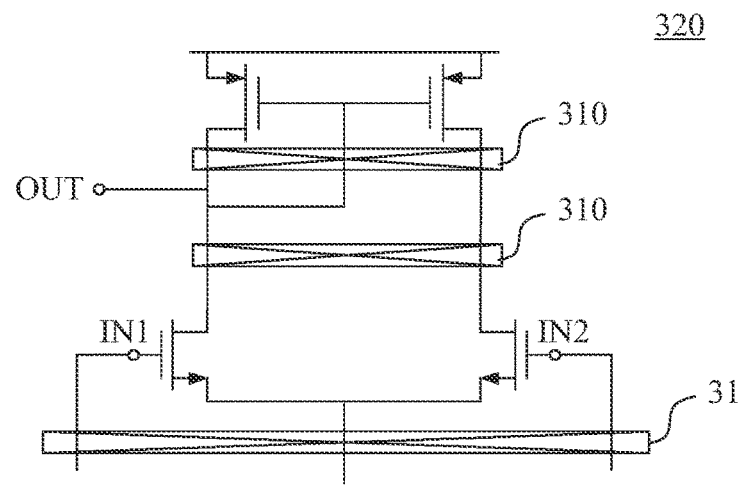
FIG. 3B is a circuit diagram of an operational amplifier according to an embodiment of the present disclosure.

Reference is made to FIG. 3B. FIG. 3B is a circuit diagram of an operational amplifier 320 according to an embodiment of the present disclosure.

The operational amplifier 320 can be used to implement the voltage equalization circuit 114 and the comparison circuit 130 in the temperature sensing circuit 300, and includes two input terminals IN1, IN2 and an output terminal OUT. Taking the voltage equalization circuit 114 as an example, the two input terminals IN1 and IN2 can be electrically coupled to the drain electrodes D1 and D2 of the P-type metal-oxide-semiconductor transistor P1 and P2 respectively, and the output terminal OUT can be electrically coupled to the gate electrodes G1 and G2 of the P-type metal-oxide-semiconductor transistors P1 and P2. The two input terminals IN1 and IN2 of the comparison circuit 130 can be electrically coupled to the first terminal F1 of the variable resistor RV and the first terminal T1 of the resistor RG, respectively. The output terminal OUT can be used to generate a comparison result CR.

In one embodiment, the operational amplifier 320 may also be provided with an averaging circuit 310 to average the corresponding one of the voltage signals, thereby further improving the accuracy.

It should be noted that the circuit structures of the temperature sensing circuits 100, 200, and 300 shown in FIG. 1, FIG. 2, and FIG. 3A are merely examples. In other embodiments, the temperature sensing circuits 100, 200, and 300 can incorporate other circuit components without affecting the operation of the circuits described above. The disclosure is not limited to this.

Further, in the foregoing embodiment, the first temperature coefficient is a negative temperature coefficient, and the second temperature coefficient is a positive temperature coefficient or a zero temperature coefficient. In other embodiments, when the first temperature coefficient and the second temperature coefficient are different, the circuit structure may be appropriately adjusted so that the first temperature coefficient is a positive or negative temperature coefficient or a zero temperature coefficient, or the second temperature coefficient is a negative temperature coefficient. The present disclosure is not limited to the above embodiments.

Although the above embodiments disclose specific examples of the present disclosure, they are not intended to limit the present disclosure. Those with ordinary knowledge in the technical field to which the present disclosure pertains should not deviate from the principles and spirit of the present disclosure. Various changes and modifications can be made to it, so the scope of protection of the present disclosure shall be defined by the scope of the appended claims.

What is claimed is:

1. A temperature sensing circuit, comprising:
   a band gap voltage generating circuit generating a band gap voltage having a first temperature coefficient;
   a current mirror branch mirroring an image current having a second temperature coefficient different from the first temperature coefficient from the band gap voltage generating circuit;
   a variable resistor comprising a first end electrically coupled to the current mirror branch to receive the image current and generate a variable voltage at the first end;
   a comparison circuit comparing the band gap voltage and the variable voltage to generate a comparison result;
   a control circuit generating a control signal to continuously adjust a resistance value of the variable resistor according to the comparison result, and outputs a signal value when the signal value of the control signal forces the variable voltage to be substantially equal to the band gap voltage; and
   a temperature determining circuit generating a temperature value according to the signal value,
   wherein the band gap voltage generating circuit comprises:
      a current source circuit having a first current output terminal and a second current output terminal;
      a resistor comprising a first terminal electrically coupled to the first current output terminal and a second terminal, wherein the first terminal of the resistor generates the band gap voltage;
      a pair of bipolar junction transistors, a first one of the pair of bipolar junction transistors is electrically coupled to the second terminal of the resistor, and a second one of the pair of bipolar junction transistors is electrically coupled to the second current output terminal; and
      a voltage equalization circuit is electrically coupled to the first current output terminal and the second current output terminal, and control the current source circuit to make the first current output terminal and the second current output terminal having same voltage level.

2. The temperature sensing circuit of claim 1, wherein the first temperature coefficient of the band gap voltage is a negative temperature coefficient and the second temperature coefficient is a positive temperature coefficient.

3. The temperature sensing circuit of claim 1, wherein the first temperature coefficient of the band gap voltage is a negative temperature coefficient, and the second temperature coefficient is a zero temperature coefficient that makes the image current not depending to temperature.

4. The temperature sensing circuit of claim 1, wherein the control signal is a digital control signal, and the signal value is a digital code.

5. The temperature sensing circuit of claim 1, wherein the control circuit is a successive approximation control circuit.

6. The temperature sensing circuit of claim 1, wherein the current source circuit comprises:
   a first current source branch corresponding to the first current output terminal; and
   a second current source branch corresponding to the second current output terminal,
   wherein the current mirror branch generates the mirror current according to the second current source branch.

7. The temperature sensing circuit of claim 6, wherein the first current source branch comprises a first metal-oxide-semiconductor transistor, and the current mirror branch comprises a second metal-oxide-semiconductor transistor, when the variable voltage is equal to the band gap voltage, a drain voltage of the first metal-oxide-semiconductor transistor is substantially equal to a drain voltage of the second metal-oxide-semiconductor transistor.

8. The temperature sensing circuit of claim 6, further comprising:
   averaging circuits disposed between the first current source branch and the second current source branch, between the first current source branch and the current mirror branch, in the voltage equalization circuit, and in the comparison circuit, respectively, wherein each of the averaging circuits has a chopper and a dynamic element matching (DEM) circuit to average a corresponding pair of voltage signals.

9. The temperature sensing circuit of claim 6, wherein the second one of the pair of bipolar junction transistors is connected in parallel with a balancing resistor.

* * * * *